United States Patent [19]

Saeki et al.

[11] 4,455,570

[45] Jun. 19, 1984

[54] CATV SYSTEM

[75] Inventors: Yoshifumi Saeki; Kenji Yashiro, both of Tokyo, Japan

[73] Assignee: Pioneer Electronic Corporation, Tokyo, Japan

[21] Appl. No.: 311,082

[22] Filed: Oct. 13, 1981

[30] Foreign Application Priority Data

Oct. 13, 1980 [JP] Japan ............................... 55-142818
Oct. 13, 1980 [JP] Japan ............................... 55-142819
Oct. 13, 1980 [JP] Japan ............................... 55-142820

[51] Int. Cl.³ .............................................. H04N 7/10
[52] U.S. Cl. ............................................ 358/86; 455/4; 455/5
[58] Field of Search ................... 358/86, 142; 455/5, 455/4

[56] References Cited

U.S. PATENT DOCUMENTS

| | | | |
|---|---|---|---|
| 3,886,302 | 5/1975 | Kosco | 455/4 |
| 3,997,718 | 12/1976 | Ricketts | 455/5 |
| 4,057,829 | 11/1977 | Moorehead | 455/5 |
| 4,264,924 | 4/1981 | Freeman | 358/142 |
| 4,264,925 | 4/1981 | Freeman | 358/142 |
| 4,322,854 | 3/1982 | Bundens | 358/86 |
| 4,343,042 | 8/1982 | Schrock | 358/86 |
| 4,360,828 | 11/1982 | Briggs | 358/86 |
| 4,386,424 | 5/1983 | Christiansen | 358/142 |

*Primary Examiner*—Howard W. Britton
*Attorney, Agent, or Firm*—Sughrue, Mion, Zinn, Macpeak and Seas

[57] ABSTRACT

In a cable television system wherein a polling channel is provided for two-way communications between the center and the terminal units, video data signals are transmitted on request from the center to the terminal units during an otherwise idle period in said polling channel.

7 Claims, 13 Drawing Figures

FIG. 4
1 ---- WEATHER FORCAST
2 ---- SHOPPING INFORMATION
3 ---- TICKET RESERVATION
4 ---- STOCK QUOTATION
5 ---- TELEPHONE NUMBER

WHICH INFORMATION DO YOU NEED?
PLEASE PUSH THE NUMBER
BOTTON FOR YOUR
INFORMATION.

FIG. 5
WEATHER IN VARIOUS AREAS IN U.S.
1. TEXAS        CLOUDY AFTER FINE
2. CALIFORNIA   RAIN
3. NEW YORK     FINE
4. FLORIDA      CLOUDY
5. NEBRASKA     FINE
6. OHIO         FINE

IF YOU NEED MORE WEATHER
INFORMATION IN THE PARTICULAR
CITY, PLEASE PUSH THE AREA
NUMBER TO WHICH THE CITY BELONGS.

FIG. 6
WEATHER IN VARIOUS CITIES IN
NEW YORK
1. NEW YORK CITY ---- FINE
2. ALBANY ---------- FINE
3. ROCHESTER ------- FINE
4. BUFFALO --------- CLOUDY
5. SYRACUSE -------- RAIN

FIG. 7
1. REPRESENTATIVE ISSUES
2. FISHERY, MININGS
3. CONSTRUCTION, FOODSTUFFS
4. CHEMICALS, PETROLEUM
5. STEELS, METALS, MACHINERIES
6. ELECTRICS, SERVICES

FIG. 8
CROWN       254  △1   T. SANYO ELEC.  525  ▼5
MITSUMI     510  ▼1   MSHITA COM.    2050  ▼60
TAMURA      432   —   K.MSHITA ELEC.  770  △10
ALPS ELEC. 1020  △20  MSHITA KOTOB.  1500  ▼30
PIONEER    2280  △20  COLUMBIA        847  ▼10

4:00 P.M., OCTOBER 1, 1980

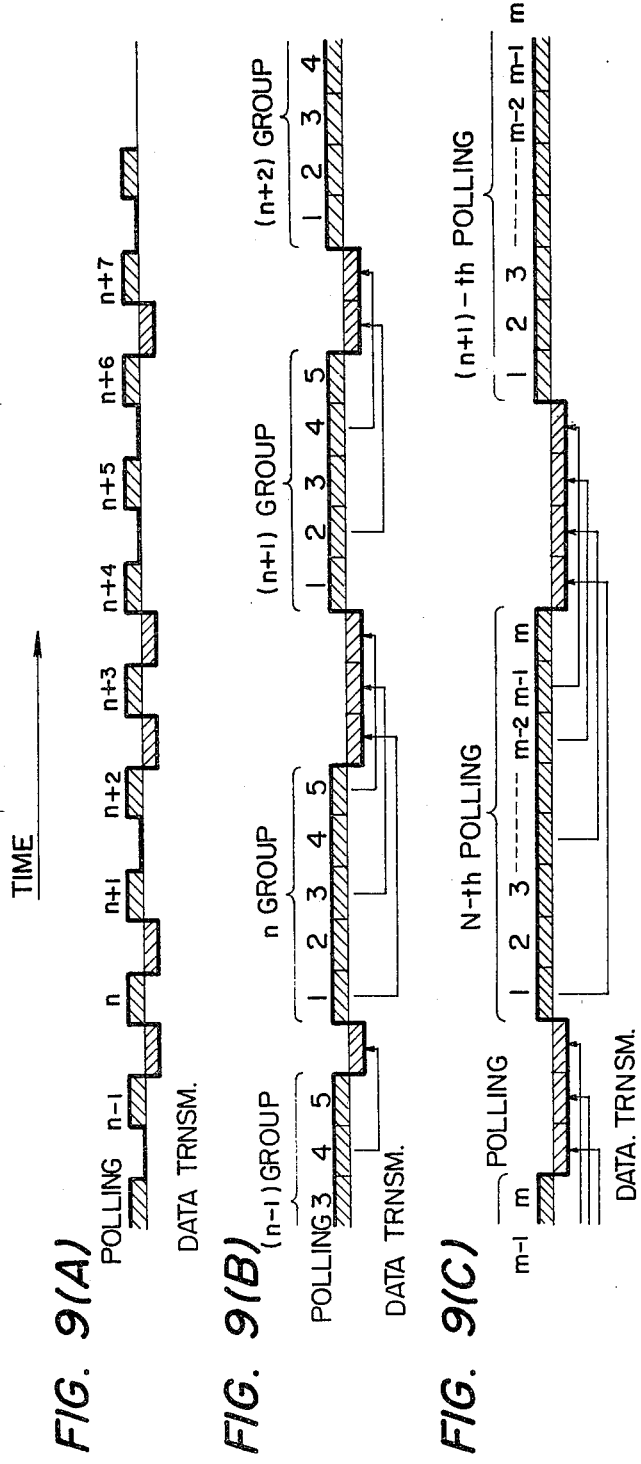

CATV SYSTEM

BACKGROUND OF THE INVENTION

This invention relates to a two-way CATV system which utilizes data lines and equipment to transmit video data signals individually to terminal units.

In general, CATV system is used to transmit television programs from a central facility (hereinafter referred to merely as "a center", when applicable) to terminal units provided at homes.

A typical example of a CATV system will be described with reference to FIG. 1. In this system, a single center facility is provided with terminal units, for instance, in several tens of thousands of homes 2. The center 1 and the terminal units form one set or group. The center 1 is connected through coaxial cables to the terminal units in the homes 2. A main cable 3 extends from the center 1, and main cable amplifiers 4 and branching units 5 are provided along the main cable 3 at predetermined points. Plural branch cables 6 extend from each branching unit 5. Extension cable amplifiers 7 and taps 8 are provided along each branch cable 6 at predetermined positions. Plural auxiliary branch cables 9 extend from each tap 8 with the auxiliary branch cables 9 leading into the homes 2. Provided in each home 2 is a terminal unit 28 including a converter 10, a television set 11 and a control box 12. The end of the auxiliary branch cable 9 is connected to the converter 10 which is in turn connected to the television set 11 and the control box 12. In this fashion, the main cable from the center 1 spreads branches repeatedly connecting the center 1 to the terminal units in the homes 2.

A signal receiving antenna 13 is installed outside the center 1. The antenna 13 is connected to a demodulator 15 in a source group 14. The source group 14 includes a video disc player 16, a video tape recorder 17, a studio 18 and other such equipment as desired. Signals from the source group 14 are applied to a modulation and transmission section 19. The section 19 includes two systems. One of the two systems includes an IF modulation circuit 20, a scrambling circuit 21, and an up-converter circuit 22 while the other includes an IF modulation circuit 23 and an up-converter 24. The outputs of the up-converter circuits 22 and 23 are connected to the main cable 3. The main cable 3 is connected to a transmitter-receiver 25 which communicates with the converters 10. The transmitter-receiver 25 is connected to a computer 26 which is connected to peripheral equipment 27 such as a printer and a display unit.

The operation of the CATV system thus constructed will now be described. First, the switch of the television set is turned on and the television set is set to a predeter-designated channel which is preferably not used by local over-the-air stations. Each converter 10 receives a plurality of signals over cable 9, and the control box 12 is operated so that the frequency of a desired channel to be received is converted into that of the designated channel by the converter 10. The channels which can be selected by the control box can be classified into a group A of channels of which television signals are received over the air by the center 1 and then retransmitted without modification, a group B of channels of independent programs provided free of charge and a group C of channels for which there is a change for viewing. There are several channels in each group. Typically, selection can be made from about twenty to thirty channels.

For the group A, a television signal received by the signal receiving antenna is demodulated by the demodulator 15 and then applied to the modulation and transmission section 19. The signal is modulated by the IF modulation circuit 23, and the frequency of the signal thus modulated is increased to a predetermined value by the up-converter circuit 24. Thus, the received television signal is changed into a signal having a desired channel frequency which is then transmitted through the main cable 3, the branch cables 6 and the auxiliary branch cables 9 to the television sets 11.

The independent programs of group B are, for instance, weather forecast programs and news programs. A television signal provided by the video disc player 16 or the video tape recorder 16, or a television signal from a live program produced in the studio 18, is modulated and frequency-multiplied by the IF modulation circuit 23 and the up-converter circuit 24 into a television signal occupying a desired channel which is then applied to the main cable 3. Each subscriber can receive the independent televison signals for a basic monthly charge, and there is no additional change regardless of the frequency or duration of viewing by the subscriber.

The chargeable programs of group C are typically new movie programs, special programs, or the like. A television signal provided by the video disc player 16 or the video tape recorder 17, or a television signal from a live program produced in the studio 18, is modulated by the IF modulation circuit 20. A scrambling synchronizing signal of predetermined form is added to the video signal portion of the television signal by the scrambling circuit 21. Because of this signal, if the television signal is received only as it is by the television set, it is impossible to reproduce normal pictures on the television set. The television signal thus treated is applied to the up-converter 22 where its frequency is increased to the frequency of a designated channel. The television signal thus processed is supplied to the main cable 3.

Upon receipt of the television signals by the television set in each home 2, the scrambled television signal is converted into a normal video signal by the converter 10 so that normal pictures can be observed on the television set 11. Whenever a chargeable program is received, a predetermined fee is charged to the subscriber, and the sum of the monthly basic charge and the special use fee is then billed to the subscriber.

In order to determine the fees owed by each subscriber, it is necessary to detect which subscribers have used what channels for particular periods of time. For this purpose, the transmitter-receiver 25 outputs a retrieving signal at predetermined time intervals to address the converter 10 in each terminal unit with an address number assigned to that particular terminal unit to determine if a group C channel is being used at the retrieval time. In response to this, the converter 10 sends to the transmitter-receiver 25 an answering signal representative of the channel which is in use at the retrieval time. The charge data transmitted and received by the transmitter-receiver 25 is arranged and stored by the computer 26 and displayed or printed out by the peripheral equipment 27. As the retrieving signal is transmitted at fixed predetermined time interval of typically several seconds to several tens of seconds, audience ratings can also be immediately calculated.

A subscriber can choose which programs he wishes to view by operating his control box 12 while watching the television set 11. The subscriber's choice or answer is encoded and sent through the coaxial cables to the center 1.

As a result of recent developments in two-way communication techniques, a communication system has been proposed in which, in response to command signals from the terminal units, the center transmits requested data to the terminal units via a television signal frequency, so that the requested data is reproduced on individual receivers of subscribers through a particular channel in the same system. However, this type of communication system has been disadvantageous in that particular television channels must be used exclusively for the transmission of data, and accordingly the number of ordinary television programs which the subscribers can enjoy is decreased.

SUMMARY OF THE INVENTION

Accordingly, it is an object of this invention to provide a CATV system which does not suffer from the above drawbacks and wherein the provision of data on request to subscribers does not decrease the number of ordinary programs available.

Briefly, this is achieved by a CATV system in which the center transmits the requested video data signals by utilizing the period of time for which no polling is carried out on the polling data channel, and wherein each terminal unit reproduces pictures on a television set from the video data signal independently of ordinary television signals. In response to a request for data, video data signals corresponding to an entire category of information are distributed to the terminal units individually, and video data sufficient for a plurality of pictures is thus stored in each terminal unit. Each terminal unit is then operated to select from its stored data the particular data desired for display without the need for further communication with the CATV center.

BRIEF DESCRIPTION OF THE DRAWINGS

In the drawings

FIGS. 4 through 6 are explanatory diagrams for a description of the operation of the embodiment in FIG. 2;

FIGS. 7 and 8 are explanatory diagrams for a description of the operation of another embodiment of the invention; and FIGS. 9A, 9B and 9C are explanatory diagrams for showing data signal transmitting methods employable in the embodiments of the invention.

DETAILED DESCRIPTION OF THE INVENTION

Figure 1:
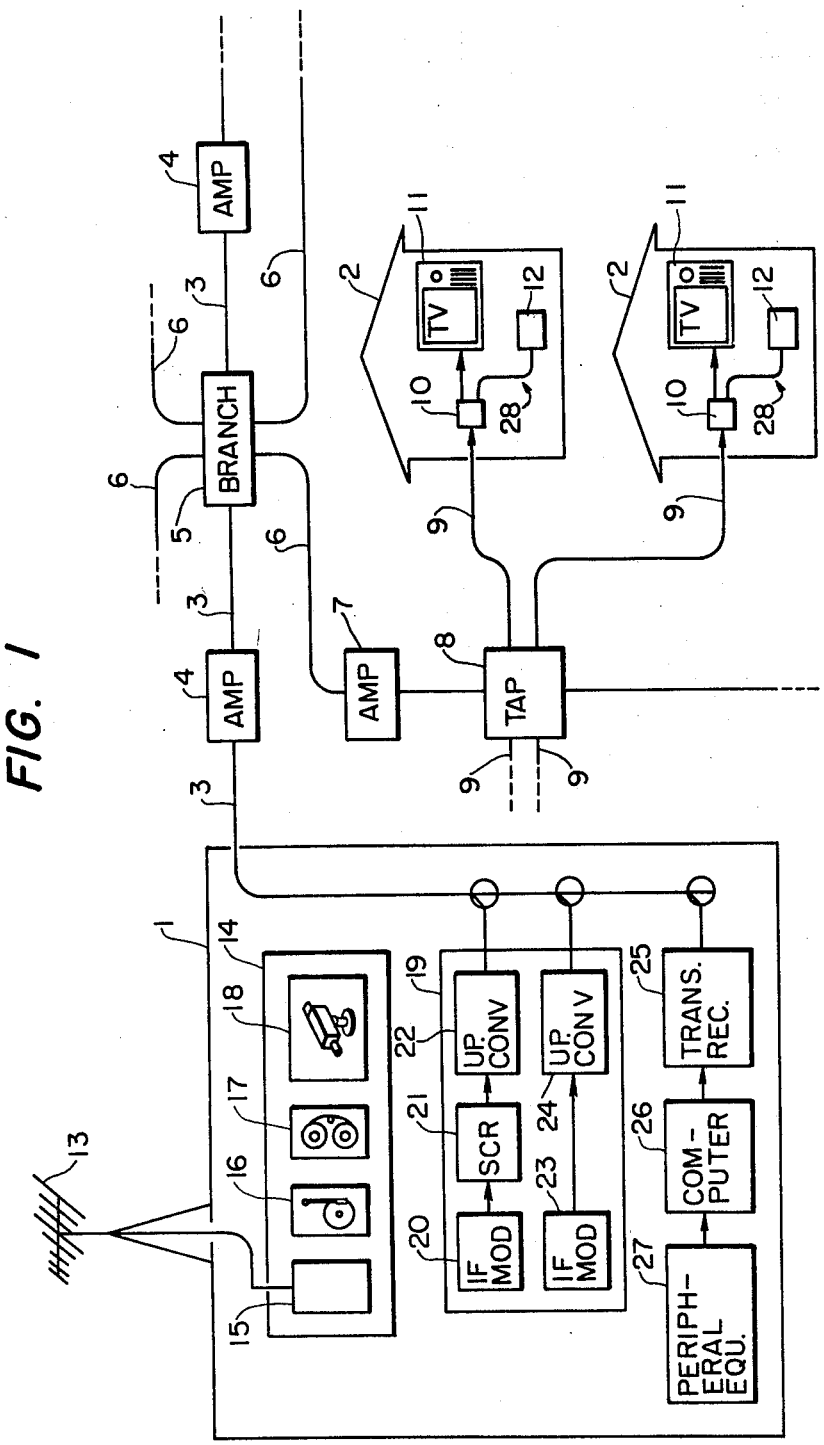
FIG. 1 is an explanatory diagram outlining the arrangement of a conventional CATV system.
Figure 2A:
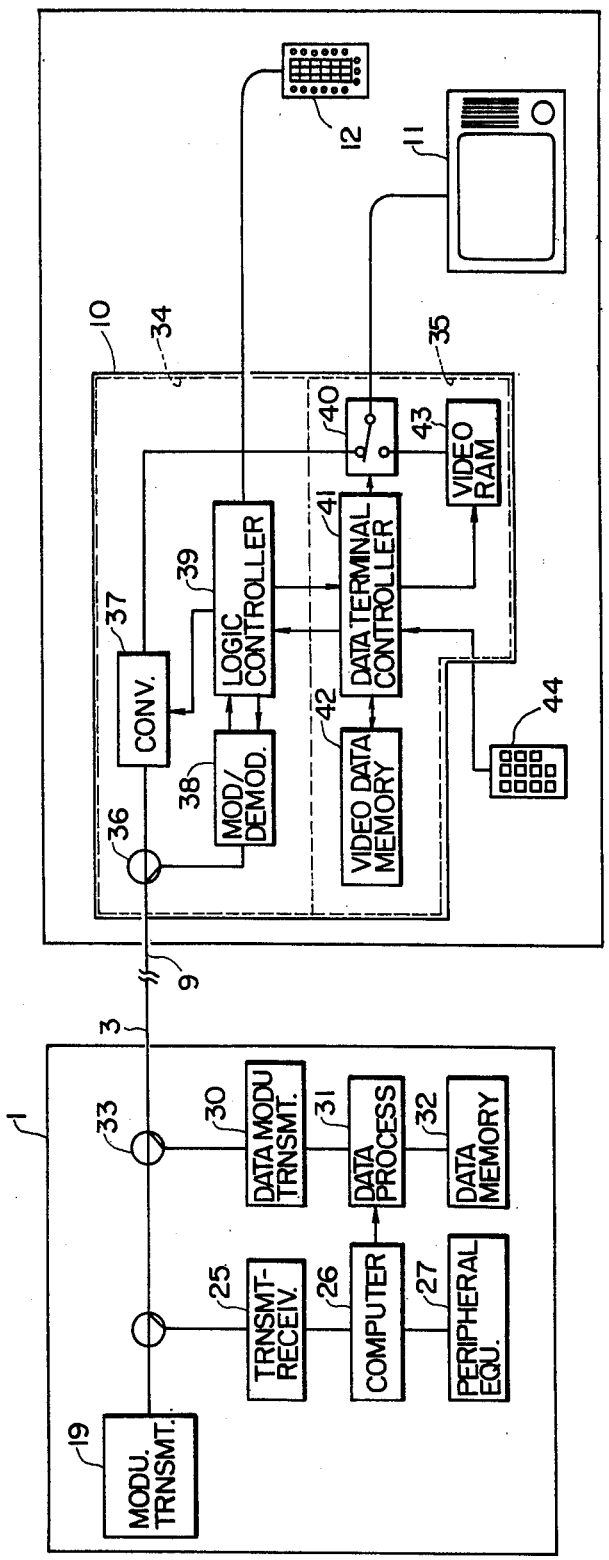
FIG. 2(A) is an overall block diagram showing one embodiment of this invention.

FIG. 2A is an overall block diagram showing one embodiment of this invention, showing an arrangement for video data communication. The center 1 is provided with the above-described data transmitter-receiver 25, computer 26 and peripheral equipment 27, and it is further provided with a data modulation transmission section 30, a data processing section 31 and a data memory section 32. The data modulation transmission section 30 is connected to the data processing section 31, which is connected to the data memory section 32. The data modulation transmission section 30 is further connected to a mixer 33 which is provided on the above-described main cable 3. Control signals from the computer 26 are applied to the data processing section 31.

The main converter box 10 carries on two-way data communication with the center 1, converts the frequency of a video signal from the center 1 into a particular channel frequency, transmits video data commands to the center 1, and controls a video data processing section 35. The main box 10 is made up of the video data processing section 35 and a CATV video processing section 34. A branch cable 9 from the center 1 is connected to a branching unit 36 in the CATV video processing section 34. The branching unit 36 is connected to a converter 37 and a demodulator 38. The output of the converter 37 is connected to a switch circuit 40. The CATV video processing section 34 has a logic controller 39 which is connected to the above-described control box 12, and the logic controller 39 is connected to a modulation/demodulation section 38 for two-way data communication. A control signal from the logic controller 39 is applied to the converter 37.

The video data processing section 35 has a data terminal controller 41 for receiving video data signals. The data terminal controller 41 and the logic controller 39 are connected to each other for two-way communication. Video data from the data terminal controller 41 is applied to a video data memory section 42, where it is stored temporarily. Video data for one picture is selectively stored in a video RAM (random access memory) 43 which is connected to the data terminal controller 41. The data terminal controller 41 is connected to a ten-key type keyboard 44. When the data terminal controller 41 applies a signal to the switch circuit 40 to operate the latter 40, the output of the video RAM 43 is applied through the switch circuit 40 to a television set 11.

Figure 3:
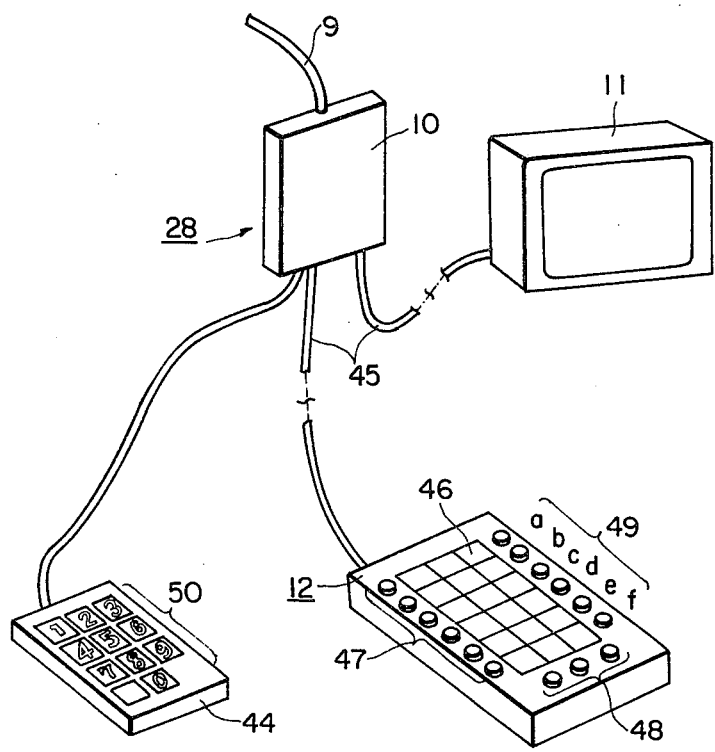
FIG. 3 is an external view of a terminal unit in the embodiment shown in FIG. 2(A)

FIG. 3 shows the arrangement of the terminal unit 28. The main box 10 is fixedly mounted, for instance, on the wall of a room. The television set 11, the control box 12 and the keyboard 44 are connected through cables 45 to the main box 10. The control box 12 and the keyboard 44 are positioned near the television set 11, and the control box 12 is preferably in the form of a relatively flat box. A rectangular channel table 46 sectioned like a checker board by numbers of horizontal and vertical lines is provided on the upper surface of the control box 12. Channel selecting buttons 47, group selecting buttons 48 and answering buttons 49 are provided on the left-hand side, the lower side and the right-hand side of the control box 12, respectively, in such a manner that these buttons surround the channel table 46 from three sides. The number of channel selecting buttons 47 and the number of group selecting buttons 48 are so selected as to correspond to the number of rows and the number of columns in the channel table 46, respectively; that is, the channel selecting buttons 47 and the group selecting buttons 48 are so positioned as to correspond to the rows and columns in the channel table 46. Therefore, when one of the channel selecting buttons 47 and one of the group selecting buttons 47 is pressed, the channel at the intersection of the corresponding row and column in the channel table 46 is selected. The answering buttons 49 are used when subscriber participation programs are run through televison channels. The keyboard 44 has a group of buttons 50 consisting of a command button and ten buttons, namely, buttons "1", "2", ... and "0".

Figure 2B:
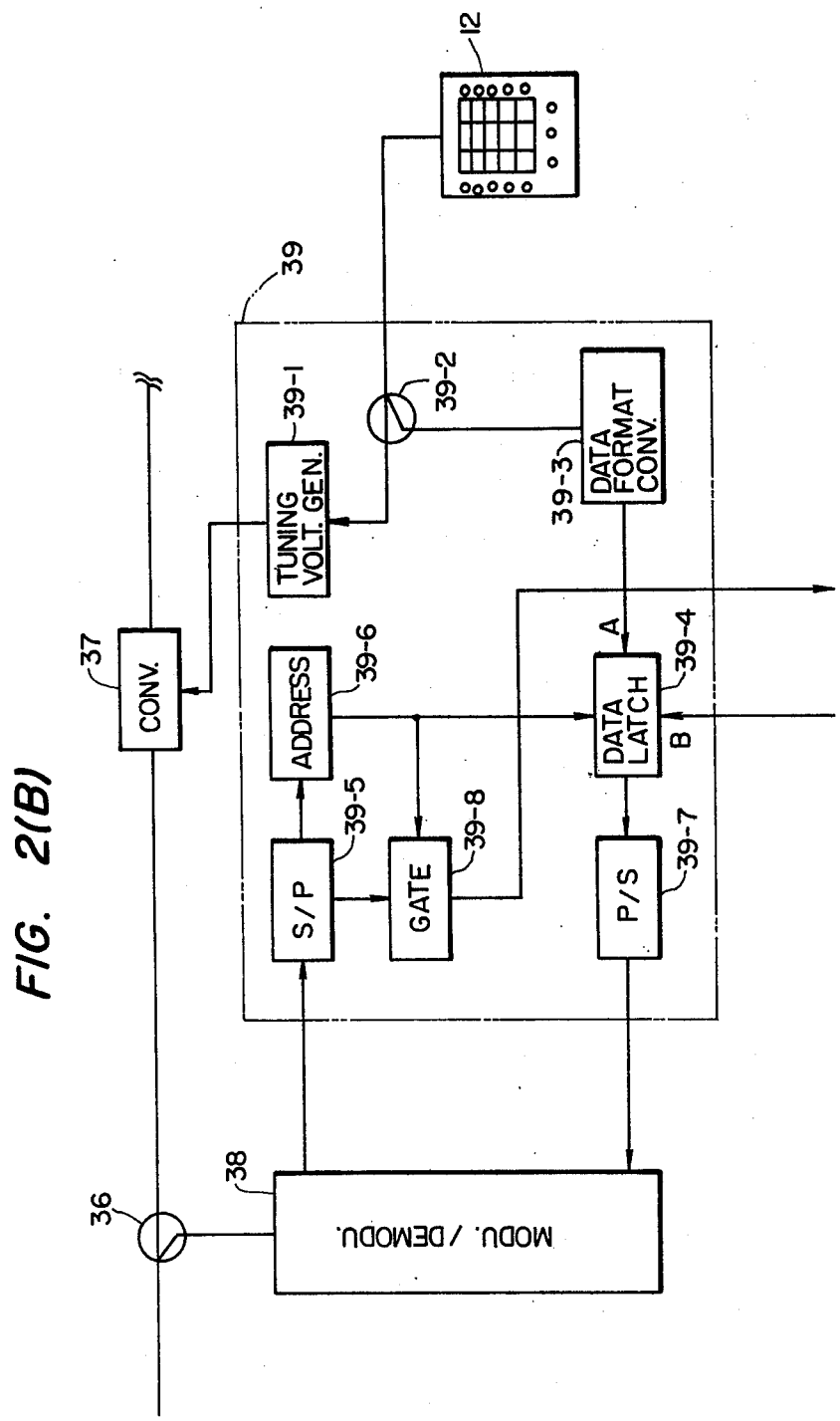
FIG. 2(B) is a block diagram of essential components of the logic controller of FIG. 2(A)

FIG. 2B is a block diagram showing the essential components contained within the logic controller 39 of FIG. 2A. The controller 39 includes a serial-to-parallel (S/P) converter 39-5 coupling signals from the modulator/demodulator 38 to an address detector 39-6 and to a gate circuit 39-8, which gate circuit 39-8 is enabled by the output of address detector 39-6. Also included are a tuning voltage generator 39-1 for providing a control signal to the converter 37, and a data format conversion circuit 39-3 for providing an output representing the selected channel. A branch circuit 39-2 provides a channel selection signal from the control box 12 to each of the circuit 39-1 and 39-2. A data latch circuit is provided for latching the signals present at either of its inputs A or B, and for reading out the latched data to parallel-to-serial (P/S) converter 39-7 in response to an output from address detecting circuit 39-6.

Figure 2C:
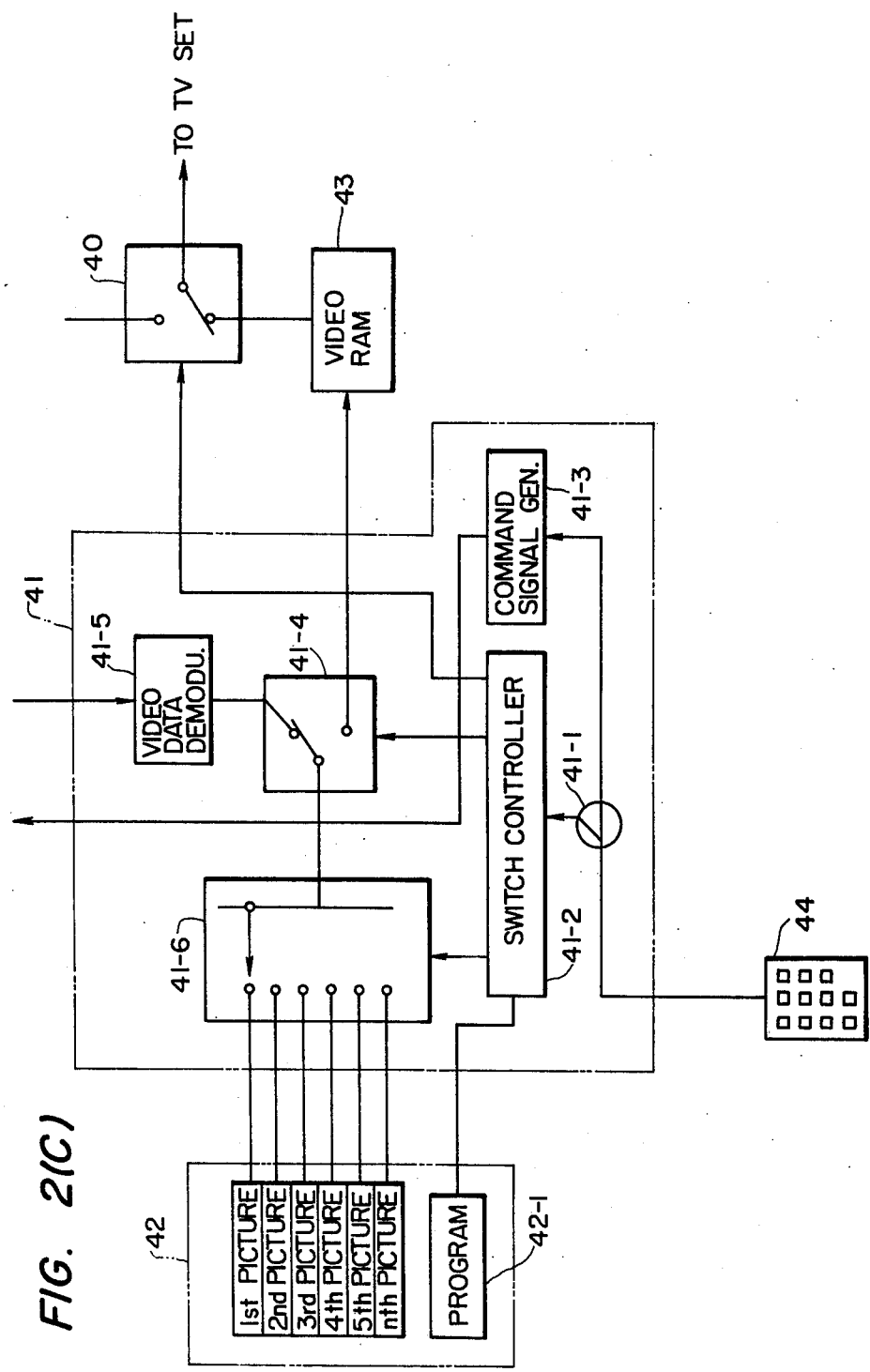
FIG. 2(C) is a block diagram of essential components of the data terminal controller of FIG. 2(A)

FIG. 2C is a block diagram showing the essential components contained within the data terminal controller 41 of FIG. 2A. The terminal controller includes a branching circuit 41-1 for providing a common input to both a switch controller 41-2 and command signal generator 41-3, the former controlling the operation of each of switches 40, 41-4 and 41-6 and the latter providing the input B of latch 39-4 a data signal indicating the command from keyboard 44. The terminal controller also includes a video data demodulator for demodulating video data received from the gate circuit 39-8.

The operation of the above-described embodiment of the invention will now be described.

When receiving the television programs at the main box 10 from the modulation transmission section 19 of the center 1, a channel selecting button 47 and a group selecting button 48 on the control box 12 are pushed as described above to select a channel to be received. A control signal representative of the selected channel is applied from the control box 12 to the main converter box 10. Thereupon, this control signal is applied to the tuning voltage generating section 39-1 through the branching unit 39-2, and a d.c. control signal obtained from the tuning voltage generating section 39-1 is applied to the converter 37, thereby converting the frequency of the channel being selected into the frequency of a particular channel (for instance channel "2"). While the channel is maintained selected, the control signal representative of this selected channel is applied through the branching unit 39-2 and the data format converter 39-3 to the data latch circuit 39-4 which latches the data signal from circuit 39-3 representing the selected channel.

When the above-described polling is carried out, the serially coded polling call signal is applied through the branching unit 36 to the modulation/demodulation section 38 and is then converted in the S/P converter 39-5 into a parallel signal. The latter parallel signal is then subjected to comparison in the address circuit 39-6 with the address number corresponding to this particular home terminal. If the polling call signal and the address number coincide, a control signal is fed from the address circuit 39-6 to the data latch circuit 39-4 and the latched data signals (as to what channel is presently used, for instance) are outputted. These latch output signals are subjected to serial coding by the P/S converter 39-7 and the resultant signals are transmitted through the branch cable 9 and the main cable 3 to the transmitter/receiver 25. During this time, the data terminal controller 41 is not operative.

Next, the reception of individual video data signals at a subscriber's home will be described.

When the command button of the group of buttons 50 on the keyboard 44 is depressed, a signal from the keyboard 44 is applied through the branching unit 41-1 to both the switch controller 41-2 and the command signal generator 41-3. Upon receipt of the signal from the keyboard 44, the switch controller 41-1 supplies switch control signals to the switch circuits 40 and 41-4, thereby switching the taps of these switch circuits to the position indicated in FIG. 2C. The command signal generator 41-3 produces a coded command signal corresponding to the depression of the command buttons, and this command signal is outputted to and latched in the data latch circuit 39-4 in the logic controller 39. When, under this condition, a polling call signal is sent out by the center 1, the control signal from the address circuit 39-6 is applied to the data latch circuit 39-4 as described above, whereupon the command signal data being latched in the data latch circuit 39-4 is transmitted through the P/S converter 39-7 and modulation/demodulation circuit 38, whereby the center is informed that the subscriber wishes a data transfer.

In the center 1, the transmitter-reveiver 25 receives the command signal, and the computer 26 detects the command signal and accordingly calls the data processing section 31. In response to this call from the computer 26, the data processing section 31 reads video data from a video data list out of the data memory section 32. The video data thus read is subjected to modulation in the data modulation transmission section 30, and the modulated video data is then transmitted to the main box 10 over the polling channel when that channel is idle between pollings.

Since the video data is digitally coded, the video data cannot be reproduced on the television set 11 without first being appropriately processed. The video data signal is transmitted to the main box 10 accompanied by the subscriber's address signal, and is applied through the branching unit 36, the modulation/demodulation section 48 and the gate circuit 39-8 in the logic controller 39, which gate circuit is rendered open in response to the control signals received from the S/P converter 39-5 and the address circuit 39-6, to the data main box controller 41. In the data terminal controller 41, the digitized data signal is demodulated in the video data demodulator 41-5 so that the television set 11 can perform the scanning operation, and the data is stored in the video data memory section 42 through the switch circuits 41-4 and 41-6.

The video data memory section 42 has enough capacity to store the video data corresponding to a plurality of pictures (see FIG. 2C). A program 42-1 capable of controlling the switch controller 41-2 is also provided in the video data memory section 42. In accordance with the program 42-1, the switch controller 41-2 changes the connection of switch 41-4 and controls the switch circuit 41-6 to derive from the video data memory section 42 a signal corresponding to the first picture. Through the switch 41-4, this single picture of data is applied to the video RAM 43. The video RAM 43 applies the video data for one picture, as a video data list, through the switch 40 to the television set 11, so that a corresponding picture is reproduced on the television set 11.

The picture thus reproduced is preferably a list of various data as shown in FIG. 4. Therefore, if the user selects a number representing the data which he wants to view and depresses the corresponding number on the keyboard 44, then a corresponding video command signal is applied from the command signal generator 41-3 in the data terminal controller 41 and is supplied to the center 1 from the modulation/demodulation section 38 through the logic controller 39. This command signal indicating a particular category of requested data is received by the data transmitter-receiver 25 and is detected by the computer 26, as a result of which the data processing section 31 is operated. That is, in response to an appropriate command signal, the data processing section 31 reads video data corresponding to the selected code out of the data memory section 32. The video data thus read is modulated by the data modulation transmission section 30 and then transmitted through the data line to the calling terminal unit 28 when the polling channel is not being used. The video data thus transmitted are those for several to several tens of pictures with respect to the selected code, and are applied through the modulation/demodulation section 38, the logic controller 39 and the dta terminal controller 41 to the video data memory section 42, where they are stored.

Among the video data, only coarse date are stored in the video RAM, and only the first of the coarse data is reproduced on the television set 11. In this connection, for example, it is assumed that a list as shown in FIG. 4 is reproduced and a command signal is issued for video data providing a weather forecast which is indicated by "1" in the list. In this case, the center 1 transmits all data concerning the weather forecast to the terminal unit 28, as a result of which the coarsest of the transmitted data, namely, a weather forecast for all over the country, is displayed as shown in FIG. 5. When the subscriber wants to know a more specific weather forecast for the state of the New York for instance, then the button "3" (which corresponds to the number provided for New York in FIG. 5) of the keyboard 44 is depressed to provide an instruction signal, which is applied to the data terminal controller 41. Thereupon, the data terminal controller 41 selects video data corresponding to the number "3" out of the video data stored in the video data memory section 42 and sends this data to the video RAM 43 (the storage of the previous picture being erased) to display the weather forecast for New York. The weather forecast video data can be selected at random from the available data stored in the video data memory section 42; that is, the selection of weather forecast video data can be made without regard to the order of memory codes.

FIGS. 7 and 8 show examples of a display in the case when "4 stock quotations" is selected out of the list shown in FIG. 4. When a command signal representing a digit "4" (corresponding to the number "4" provided for the stock quotations) is sent to the center 1 after operating keyboard 44, then all video data concerning the stock quotations are supplied to the terminal unit 28 by the center 1. In this case, the coarse codes of the stock quotations are displayed as shown in FIG. 7. If a particular one of these coarse codes is specified, then the detailed data thereof is provided. If the user wants to have data on "electrical machinery and apparatus and service" having code "6" for instance, code "6" is selected by operating the keyboard 44. In this case, video data concerning code "6" is selected out of the video data stored in the video data memory section 42, and the selected data is displayed as shown in FIG. 8. If there is any data corresponding to the code which is inputted by the keyboard, then a picture corresponding to that code can be repeatedly displayed.

Now, the data communication methods will be described. The time required for the above-described polling is only on the order of three or four seconds, even if one center 1 strobes all the terminal units 28 in several tens of thousands of homes 2. Therefore, if the polling is carried out every ten seconds, then there is about a six second interval in every ten during which no polling is effected. Accordingly, during this idle time, the video data can be transmitted through the polling data channel (frequency). The time required for transmitting a data signal of one (1) kilo-bit is about 0.1 second, and the number of bits sufficient for transmitting one still picture is about 0.05 kilo-bit. Therefore, during the aforementioned idle time, a great deal of video data signals can be transmitted. Even when the terminal units 28, for instance, in 60,000 homes 2 receive the video data, it takes only about five seconds to transmit all the data signals, since data on a particular topic can be transmitted simultaneously to a large number of subscribers who have requested that topic. Therefore, in practice, the transmission of the data signals can be achieved in a very short time.

A variety of methods of transmitting selected video data signals to the terminal units 28 can be considered. Some concrete examples of the methods are as shown in FIGS. 9(A)-9(C). In these FIGS. 9(A)-9(C), the time axis is indicated by a straight horizontal line, and time passes from the left-hand side towards the right-hand side as indicated by the arrow. Polling periods and data signal transmitting periods are indicated by blocks provided respectively above and below the straight line.

In FIG. 9(A), the video data signal transmitting period is provided after each terminal unit 28 has been polled; that is, in this case, the polling is intermittently carried out. In this method, if, after polling a particular terminal unit 28, the command signal requesting video data is detected, then video data signals are transmitted immediately after the polling. In the case of FIG. 9(A), video data signals are transmitted to the (n−1)-th, n-th, (n+2)-th, (n+3)-th and (n+6)-th homes 2.

In the method shown in FIG. 9(B), a predetermined number of pollings are grouped. If a terminal unit 28 issues a command signal requesting the transmission of a video data signal, then the video signal together with the address number of the terminal unit 28 is transmitted to the terminal unit 28 after the predetermined number of pollings have been made. In the case of FIG. (B), the first, third and fifth terminal units 28 in the n-th group of pollings issue the command signals; and in response to the command signals the video data signals are transmitted to the first, third and fifth terminal units 28 after the polling has been completed for the n-th group.

In the method shown in FIG. 9(C), the polling has been completed for all the terminal units 28 in the homes 2, so that a list of the terminal units 28 issuing the command signals are stored in the computer 26, and then after completion of all polling the video data signals together with the address numbers of the terminal units 28, which have been stored in the computer 26, are successively transmitted to the terminal units 28. In the case of FIG. 9(C), the first, the fourth, the (m−2)-th and the (m−1)-th terminal units 28 issue the command signals, and the video data signals are successively transmitted thereto after the polling. The video data signals are transmitted whenever the polling has been accomplished, and immediately after the transmission of the video data signals the next polling is started.

Only the esential features for a proper understanding of the invention have been set forth, various details having been omitted which would be obvious to the ordinarily skilled artisan in view of the above description. For Example, there must obviously be some means provided for discriminating between a request for data from the center 1 and a selection of data a already in the memory 42. If the subscriber wishes to view the weather forecast for Nebraska, he will push "5", and this may result in a new command signal being sent from signal generator 41-3 back to the center 1. However, if the center 1 subsequently sends new data, it cannot pass switch 41-4 which has been switched to its lower position and will remain there permitting data transfer only between the memory 42 and video RAM 43 until the control box 12 is operated to transfer the television back to its regular program mode.

Obviously, other techniques could be used such as a providing a further button on the control box 12 which would be pressed preceding a number selection to indicate that the following selected number should be transmitted to the center 1. Also, techniques for data transfer between memories and for conversion from digital information to video format signals are widely known in the art, and any programming necessary to perform the simple data transfer operations required of this invention would be easily within the skill of the ordinary artisan.

The above-described embodiments of the invention may be modified as follows:

(a) If a video data signal transmitted from the center 1 is long, it can be divided into two or three parts, so that one of these parts is transmitted and stored in the video data memory section 42 after every polling. In this case, the capacity of the memory section 42 can be more economically utilized.

(b) The center 1 must recognize each terminal unit 28 so as to transmit a data signal satisfying the content of the command signal from the terminal unit 28. For this purpose, the data signal can be transmitted in succession with the respective address signal. However, in those cases where a terminal unit 28 which is intended to receive the data signal can be specified by the polling technique itself, for instance as in the case of FIG. 9(A), only the data signal can be transmitted with the address number omitted.

(c) In the above-described embodiments, the keyboard 44 is provided separately from the control box, so that the individual video data can be specified by operating the keyboard 44. However, the answering buttons 49 on the control box 12 may be so designed as to operate as the individul specifying buttons. In this case, one of the buttons 49, e.g. the button (f) is employed as a video data request button, in such a manner that upon depression of the button the video data for the list as shown in FIG. 4 is transmitted. In addition, the buttons (a), (b), (c), . . . are employed as "Weather Forecast", "Shopping Information", "Ticket Reservation", . . . request buttons, so that the video data can be selected successively from coarse to fine. If the subscribers file registrations with the center 1, then the video data communications may include information on individual addresses, telephone numbers, or the like.

With the CATV system of the invention arranged as described above, the video data signals can be transmitted through the data channel instead of the television program channels, and different terminal units can receive different video data by using the same frequency—without decreasing the available channels by using a particular television channel exclusively. The terminal units themselves can then select coarse video data and fine video data as desired.

If, the video data is to be used for a television game, the center can provide new television games regularly, and the subscribers can enjoy fresh television games every day.

Furthermore, if the subscribers file registrations with the center for their own video data, they can then utilize the CATV system as their own library, for instance.

What is claimed is:

1. A cable television system of the type comprising a plurality of subscriber terminal units, each including a television set, a transmission center and a cable network connected to said transmission center and terminal units for carrying television video signals from said center to said terminal units, the improvement comprising:

two-way communication means for providing two-way communication between said center and terminal units, said two-way communication means including means for transmitting video data signals to said terminal units over a data channel, which data channel is not used for normal television program signals, said two-way communication means comprising:

a data memory section at said center for storing video data;

a data processing section at said center for reading video data from said data memory section according to a video data command signal received over a data channel from a particular terminal unit and for transmitting said video data over said data channel to said particular terminal unit;

a video data processing section at said terminal unit for transmitting said video data command signal to said center over said data channel and for displaying said video data transmitted by said center on said television set.

2. A cable television system of the type comprising a plurality of subscriber terminal units each including a television set, a transmission center, a cable network connecting said center and terminal units for transmitting television video signals from said center to said terminal units, and two-way communication means for providing two-way communications between said center and terminal units, said two-way communication means comprising:

a data memory section at said center for storing video data;

a data processing section at said center for reading video data from said data memory section in accordance with a video data command signal received from a particular terminal unit and for transmitting said video data to said terminal unit over said cable network; and a video data processing section at each terminal unit for applying video data command signals to said center, said video data processing section including a video data memory for storing said video data transmitted by said center and means for selecting a portion of said video data for display on said television.

3. A cable television system as defined in claim 2, wherein said video command signals to said center and said video data to said terminal unit are transmitted over a common data channel.

4. A cable television system as defined in claim 2, wherein said two-way communication means comprises:
  a data memory section at said center for storing video data;
  a data processing section at said center for reading video data from said data memory section according to a video data command signal received over a data channel from a particular terminal unit and for transmitting said video data over said data channel to said particular terminal unit;
  a video data processing section at said terminal unit for transmitting said video data command signal to said center over said data channel and for displaying said video data transmitted by said center on said television set.

5. A cable television system as defined in claim 4, wherein said data memory section at said center stores a plurality of categories of data, and said video data command signal specifies a particular one of said categories of data to be transferred.

6. A cable television system as defined in any one of claims 2 through 5, wherein said two way communication means includes means for polling said terminal units over the same data channel used to transmit said video data signals from said center to said terminal units.

7. A cable television system as defined in claim 6 wherein said center transmits polling signals to said terminal units over said data channel with intervals between at least some of said polling signals and wherein said video data command signal is sent to said center from a particular terminal unit in response to a polling signal received from said center over said data channel, and wherein said video data is transmitted from said cener to said particular terminal unit during one of said intervals.

* * * * *